US008600157B2

(12) United States Patent
Hsieh et al.

(10) Patent No.: US 8,600,157 B2
(45) Date of Patent: Dec. 3, 2013

(54) METHOD, SYSTEM AND COMPUTER PROGRAM PRODUCT FOR OBJECT COLOR CORRECTION

(75) Inventors: Chun-Wei Hsieh, Taipei (TW); I-Ju Tsai, Taipei County (TW)

(73) Assignee: Institute for Information Industry, Taipei (TW)

( * ) Notice: Subject to any disclaimer, the term of this patent is extended or adjusted under 35 U.S.C. 154(b) by 403 days.

(21) Appl. No.: 12/943,530

(22) Filed: Nov. 10, 2010

(65) Prior Publication Data

US 2012/0039531 A1 Feb. 16, 2012

(30) Foreign Application Priority Data

Aug. 13, 2010 (TW) ................................ 99127094 A

(51) Int. Cl.
*G06K 9/00* (2006.01)
(52) U.S. Cl.
USPC ........................................................ 382/167
(58) Field of Classification Search
USPC ........................................................ 382/167
See application file for complete search history.

(56) References Cited

U.S. PATENT DOCUMENTS

| 7,384,193 | B2 | 6/2008 | Eliasson |
| 7,991,227 | B2 * | 8/2011 | Sasaki ............................ 382/167 |
| 2001/0028738 | A1 * | 10/2001 | Pettigrew et al. .............. 382/162 |
| 2003/0083850 | A1 * | 5/2003 | Schmidt et al. ................ 702/189 |
| 2003/0174222 | A1 * | 9/2003 | Uchida .......................... 348/241 |
| 2004/0057614 | A1 * | 3/2004 | Ogatsu et al. .................. 382/162 |
| 2004/0100563 | A1 | 5/2004 | Sablak et al. |
| 2004/0263625 | A1 | 12/2004 | Ishigami et al. |
| 2004/0264772 | A1 * | 12/2004 | Une ............................... 382/167 |
| 2005/0046703 | A1 | 3/2005 | Cutler |
| 2005/0276473 | A1 * | 12/2005 | Um et al. ....................... 382/167 |
| 2006/0066723 | A1 | 3/2006 | Iwase et al. |
| 2006/0119910 | A1 * | 6/2006 | Sasaki ............................ 358/518 |
| 2007/0115518 | A1 * | 5/2007 | Shen et al. ..................... 358/518 |
| 2007/0252848 | A1 * | 11/2007 | Sawada ......................... 345/602 |
| 2008/0088807 | A1 | 4/2008 | Moon et al. |
| 2008/0304739 | A1 * | 12/2008 | Sasaki ............................ 382/167 |
| 2010/0026206 | A1 * | 2/2010 | Sekulovski et al. ........... 315/294 |

FOREIGN PATENT DOCUMENTS

| WO | WO-2004/004320 A1 | 1/2004 |
| WO | WO-2007-147171 A2 | 12/2007 |

* cited by examiner

*Primary Examiner* — Jingge Wu
(74) *Attorney, Agent, or Firm* — Muncy, Geissler, Olds & Lowe, PLLC

(57) ABSTRACT

A method, a system, and a computer program product for object color correction are provided. Two images of the same target provided by two image capturing devices are introduced into an image conversion model constructed by an image conversion algorithm, and a color coefficient and a luminance coefficient for color space conversion are found, so as to convert the two images to a target color space. Then, the two images in the target color space are introduced into an image color distribution space model constructed by the image conversion algorithm, so as to obtain two different image color distribution space principal axes. The two image color distribution space principal axes are compared and adjusted to be parallel, thereby adjusting a color difference between the two images. The two images that are adjusted are converted back to an original color space, so as to obtain the two corrected images.

8 Claims, 6 Drawing Sheets

METHOD, SYSTEM AND COMPUTER PROGRAM PRODUCT FOR OBJECT COLOR CORRECTION

CROSS-REFERENCE TO RELATED APPLICATION

This application claims the benefit of Taiwan Patent Application No. 099127094, filed on Aug. 13, 2010, which is hereby incorporated by reference for all purposes as if fully set forth herein.

BACKGROUND OF THE INVENTION

1. Field of Invention

The present invention relates to a method, a system and a computer program product for object color correction, and more particularly to an object color correction method, system, and computer program product that perform color correction on the same subject matter in different images with different color levels.

2. Related Art

Currently, for traffic safety or public security, monitors are disposed at crossings or exits and entrances of buildings. However, due to the influence of angles at which the monitors are disposed and light, the phenomenon of color distortion occurs easily in display on screens.

Most of existing methods for increasing the resolution are implemented with hardware. A current super-resolution image reconstruction technology is classified into two categories, namely, static image super-resolution and dynamic image super-resolution. The static image super-resolution refers to reconstructing a high resolution image with contents of a single low resolution image. Methods currently commonly used for the static image super-resolution can be classified into three categories: 1. polynomial interpolation; 2. edge-directed interpolation; and 3. sample-based super-resolution technology.

Firstly, the polynomial interpolation is currently the most widely applied method for the static image super-resolution, and mainly has such advantages as a simple algorithm, a high operation speed, and a good effect in smooth regions. Common polynomial interpolation methods are zero-order interpolation, bilinear interpolation, and bicubic interpolation.

Secondly, the edge-directed interpolation method is proposed mainly for solving the problem that high-frequency information cannot be effectively presented with the polynomial interpolation. The high-frequency information refers to texture and edge regions of an image. Because sensing of human eyes for the texture region is weak, the emphasis of the method is to reserve an edge part. The basic idea of the algorithm is to firstly find parts belonging to edges in the image, and determine directions of these edges, and then through the two kinds of edge-relevant information, perform a suitable conversion with a sampling function in a direction of an edge that is detected, so that edges in different directions each have one sampling function in itself direction to perform interpolation. Since the practice takes not only characteristics of the entire image but also characteristics of each region in the image into consideration, the effect of image amplification is good. However, the method can only perform interpolation and reconstruction to reserve image edges by finding trends of the edges, and thus can be achieved only through rather complex operation. Furthermore, the method cannot be used in a high-frequency texture region, so that there is still room for improvement in terms of the visual quality.

Thirdly, the concept of the sample-based super-resolution is to use an existing high resolution image to serve as training data of a model, and to generate a database of possible corresponding relationships between a low resolution and a high resolution, thereby enhancing high-frequency information that a low resolution image lacks. The method improves the visual quality of the image mainly with emulated high-frequency information rather than original real high-frequency information of the image. The problems existing in the method are how to establish a correspondence database of high frequency and low frequency that can meet all demands, and how to quickly find matched data from the huge correspondence database.

SUMMARY OF THE INVENTION

Accordingly, the present invention is directed to a method, a system, and a computer program product for object color correction, which mainly perform color correction on target objects in two different images, so as to achieve the purpose of reducing a color difference between the target objects in the two different images.

A method for object color correction is provided in the present invention. The steps of the method comprises: obtaining a first image of a first image capturing device and a second image of a second image capturing device; constructing an image conversion model and an image color distribution space model according to an image conversion algorithm; introducing the first image and the second image into the image conversion model, and calculating a target image color coefficient and a target image luminance coefficient for converting the first image and the second image from an original color space to a target color space by using the image conversion algorithm; converting the first image and the second image from the original color space to the target color space according to the target image color coefficient and the target image luminance coefficient; respectively introducing the first image and the second image in the target color space into the image color distribution space model, so as to obtain a first image color distribution space principal axis and a second image color distribution space principal axis respectively; comparing the first image color distribution space principal axis and the second image color distribution space principal axis, and correcting them by a processing unit so that the first image color distribution space principal axis and the second image color distribution space principal axis are parallel to each other, so as to adjust a color difference between the first image and the second image; reintroducing the first image and the second image in the target color space into the image conversion model, so as to convert the first image and the second image from the target color space to the original color space; and obtaining the corrected first image and the corrected second image.

A system for object color correction is provided in the present invention. The system comprises: a first image capturing device, for obtaining a first image; a second image capturing device, for obtaining a second image; a storage unit, for storing an image conversion algorithm; and a processing unit, for converting the first image and the second image from an original color space to a target color space according to the image conversion algorithm, and correcting principal axes of the first image and the second image in the target color space, so as to obtain the first image and the second image having a same color after correction after the first image and the second image are converted back from the target color space to the original color space.

A computer program product for object color correction is provided in the present invention. The computer program product is loaded into a computer to perform image correction.

In one embodiment, the first image and the second image have a same subject matter. The purpose of the present invention is to perform color correction for the first image and the second image.

In one embodiment, the first image capturing device and the second image capturing device are one of a camera and a video camera.

In one embodiment, the image color distribution space model uses different coefficients of an image color as axes.

In the present invention, the original color space is an RGB color space, the target color space is one of an LAB color space, an HSV color space, and a YUV color space.

In the present invention, since a color space distribution structure is adopted, a color of an image can be corrected by using a principal axis in a color space, thereby avoiding the problem in judgment caused by different shooting angles of different image capturing devices and different luminance.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

In order to make the aforementioned features and advantages of the present invention more comprehensible, embodiments accompanied with figures are described in detail below.

Figure 1:
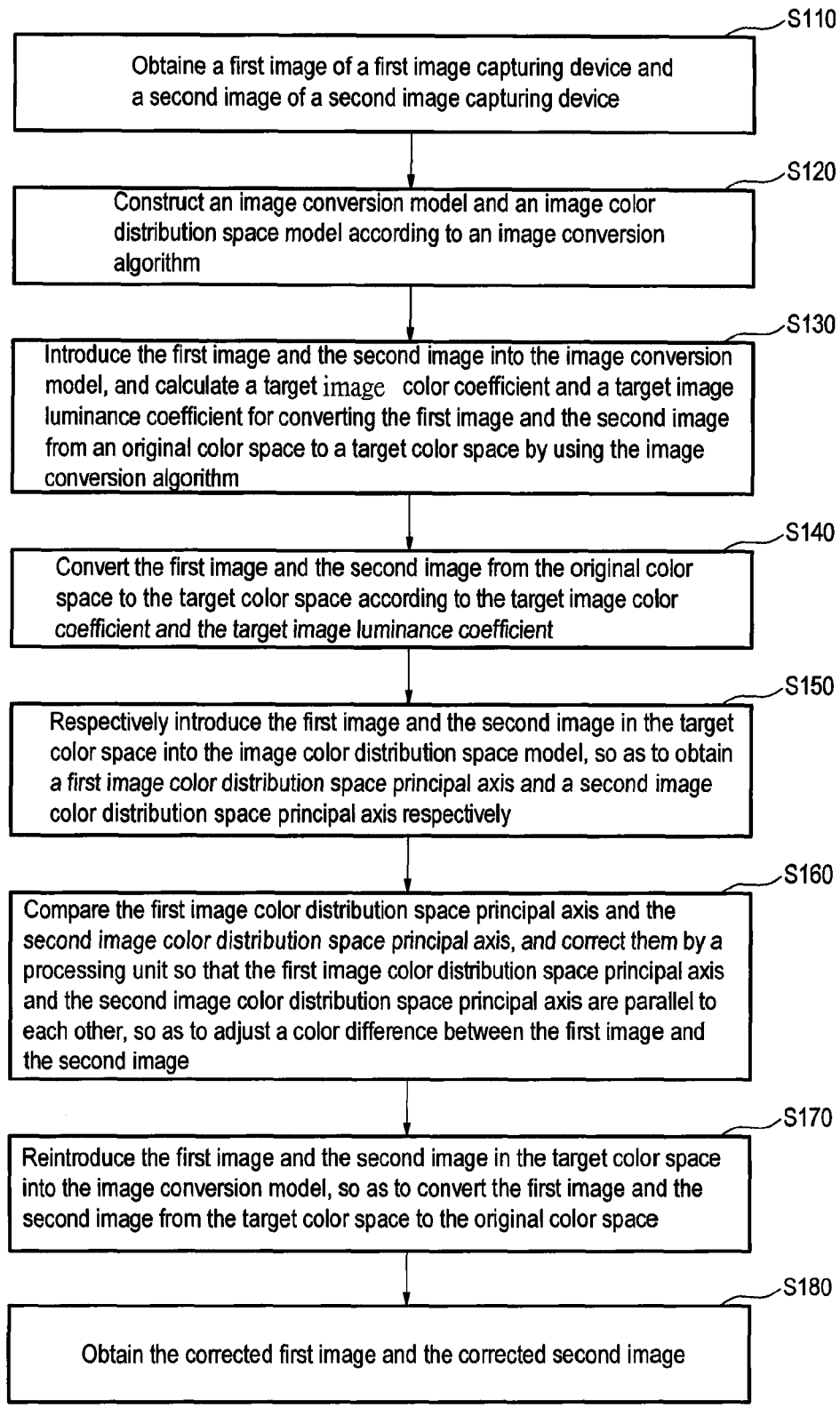
FIG. 1 is a flow chart of steps in an embodiment of the present invention.

FIG. 1 is a flow chart of steps in an embodiment of the present invention. An object color correction method according to the present invention mainly includes the following steps.

In Step S110, a first image of a first image capturing device and a second image of a second image capturing device are obtained.

In this embodiment, the first image capturing device and the second image capturing device are disposed at different locations. Because the disposed locations of the first image capturing device and the second image capturing device are different, under the influence of light and a shooting angle, a color difference is easily generated for an obtained photographic image.

In Step S120, an image conversion model and an image color distribution space model are constructed according to an image conversion algorithm.

In this embodiment, the image color distribution space model uses different image coefficients as axes respectively, and after an image is analyzed, an image color distribution space model is used to represent various pictures.

In Step S130, the first image and the second image are introduced into the image conversion model, and a target image color coefficient and a target image luminance coefficient for converting the first image and the second image from an original color space to a target color space are calculated by using the image conversion algorithm.

In this embodiment, the original color space is an RGB color space, while the target color space is an LAB color space, an HSV color space, or a YUV color space. The LAB color space is a color-opponent space with a dimension L for luminance and a and b for color-opponent dimensions, based on nonlinearly compressed CIE XYZ color space coordinates. HSV is two related representations of points in the RGB color space, which attempts to describe the perceptual color relationships more accurately than RGB while maintaining a simple calculation. YUV is a color encoding method. YUV is the type to compile a true-color color space. Such terms as Y'UV, YUV, YCbCr, and YPbPr can all be referred to as YUV, and are overlapped with each other.

In Step S140, the first image and the second image are converted from the original color space to the target color space according to the target image color coefficient and the target image luminance coefficient.

In Step S150, the first image and the second image in the target color space are respectively introduced into the image color distribution space model, so as to obtain a first image color distribution space principal axis and a second image color distribution space principal axis respectively.

In Step S160, the first image color distribution space principal axis and the second image color distribution space principal axis are compared, and are corrected by a processing unit so that the first image color distribution space principal axis and the second image color distribution space principal axis are parallel to each other, so as to adjust a color difference between the first image and the second image.

In this embodiment, the first image color distribution space principal axis and the second image color distribution space principal axis use luminance of the first image and the second image as principal axes, and after the first image and the second image are adjusted through brightness, angles of the first image and the second image can also be adjusted.

In Step S170, the first image and the second image in the target color space are reintroduced into the image conversion model, so as to convert the first image and the second image from the target color space to the original color space.

In Step S180, the corrected first image and the corrected second image are obtained.

In this embodiment, after the corrected first image and the corrected second image are obtained, an image angle of a selected region at a time point can be further adjusted according to dynamic time.

Figure 2:
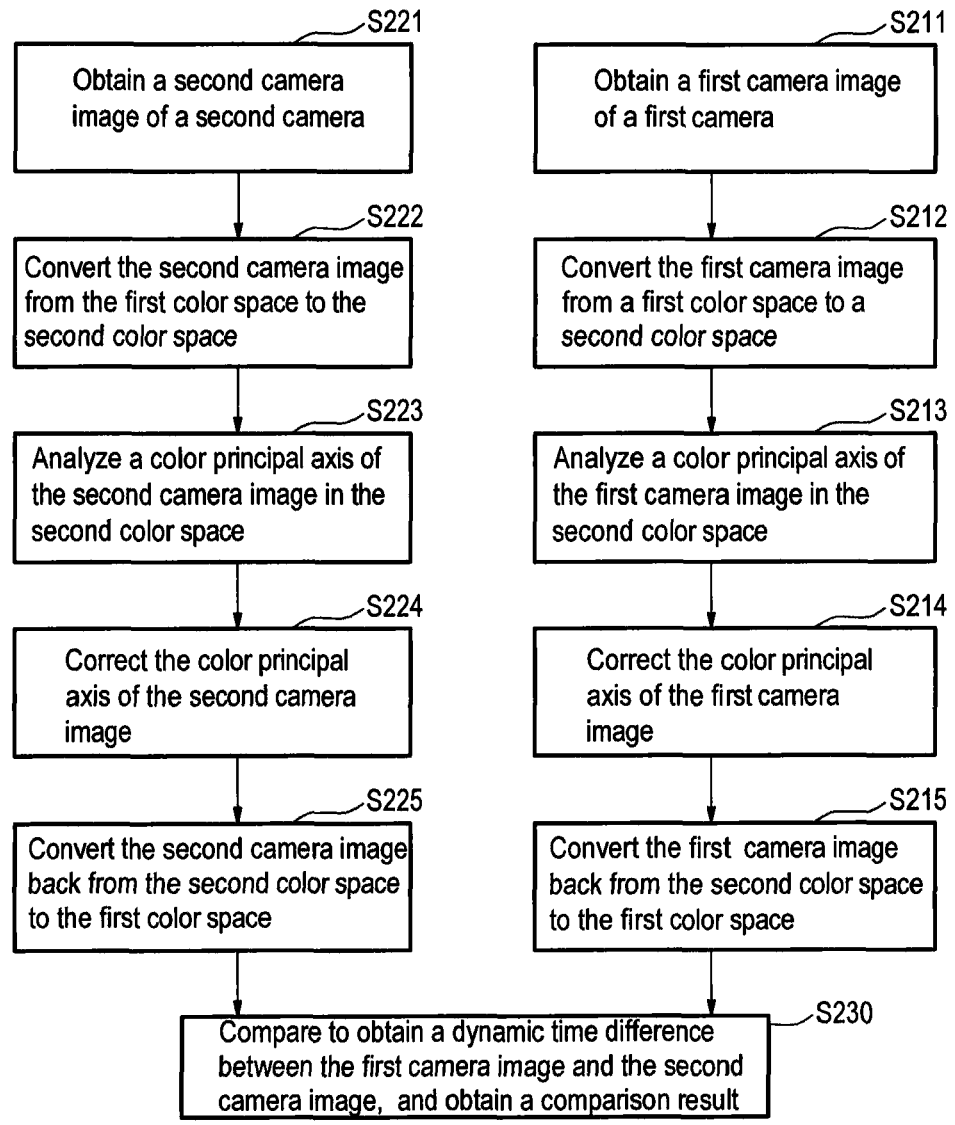
FIG. 2 is a flow chart of steps in another embodiment of the present invention.

FIG. 2 is a flow chart of steps in another embodiment of the present invention. The flow can be divided into two parts, and the step flow of the first part is corresponding to that of the second part. In this embodiment, illustration is made by taking a first camera and a second camera at adjacent sites as an example.

An image processing process of the first camera is as follows. Firstly, in Step S211, a first camera image of the first camera is obtained. Then, in Step S212, the first camera image is converted from a first color space to a second color space. Next, in Step S213, a color principal axis of the first camera image in the second color space is analyzed. In Step S214, the color principal axis of the first camera image is corrected.

Finally, in Step S215, the first camera image is converted back from the second color space to the first color space.

An image processing process of the second camera is as follows. Firstly, in Step S221, a second camera image of the second camera is obtained. Then, in Step S222, the second camera image is converted from the first color space to the second color space. Next, in Step S223, a color principal axis of the second camera image in the second color space is analyzed. In Step S224, the color principal axis of the second camera image is corrected. Finally, in Step S225, the second camera image is converted back from the second color space to the first color space.

After the foregoing steps end, Step S230 is performed to compare dynamic time of the first camera image and the second camera image after color correction that are converted back from the second color space to the first color space, so as to obtain required image information.

Figure 3:
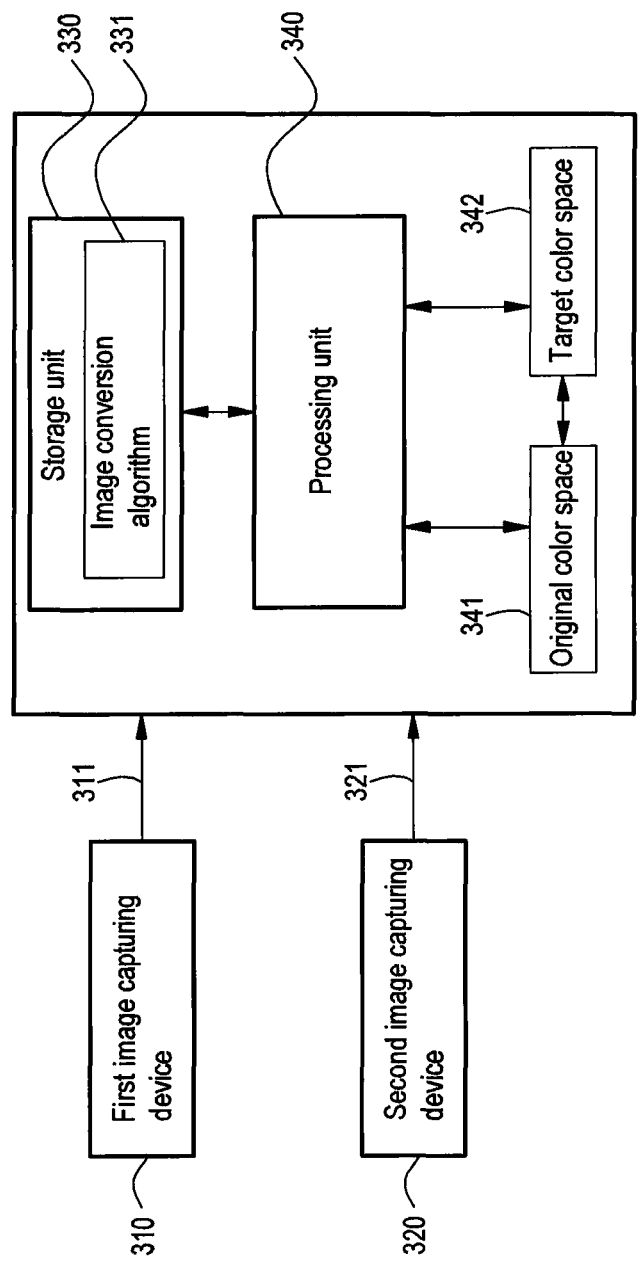
FIG. 3 is a structural block diagram of a system in the present invention.

FIG. 3 is a structural block diagram of a system in the present invention. The present invention provides a system for object color correction, which includes a first image capturing device 310, a second image capturing device 320, a storage unit 330, and a processing unit 340. The first image capturing device 310 and the second image capturing device 320 may be one of a camera and a video camera, including but not limited to. The first image capturing device 310 obtains a first image 311, the second image capturing device 320 obtains a second image 321, and the storage unit 330 stores an image conversion algorithm 331. The processing unit 340 converts the first image 311 and the second image 321 from an original color space 341 to a target color space 342 according to the image conversion algorithm 331, and corrects principal axes of the first image 311 and the second image 321 in the target color space 342, so as to obtain the first image 311 and the second image 321 having the same color after correction after the first image 311 and the second image 321 are converted back from the target color space 342 to the original color space 341.

The present invention provides a computer program product for object color correction, which is loaded into a computer to perform color correction on a first image and a second image, and will not be described herein again.

Figure 4:
FIG. 4 is a schematic view of a photographic image on which image color analysis is to be performed in another embodiment.
Figure 5:
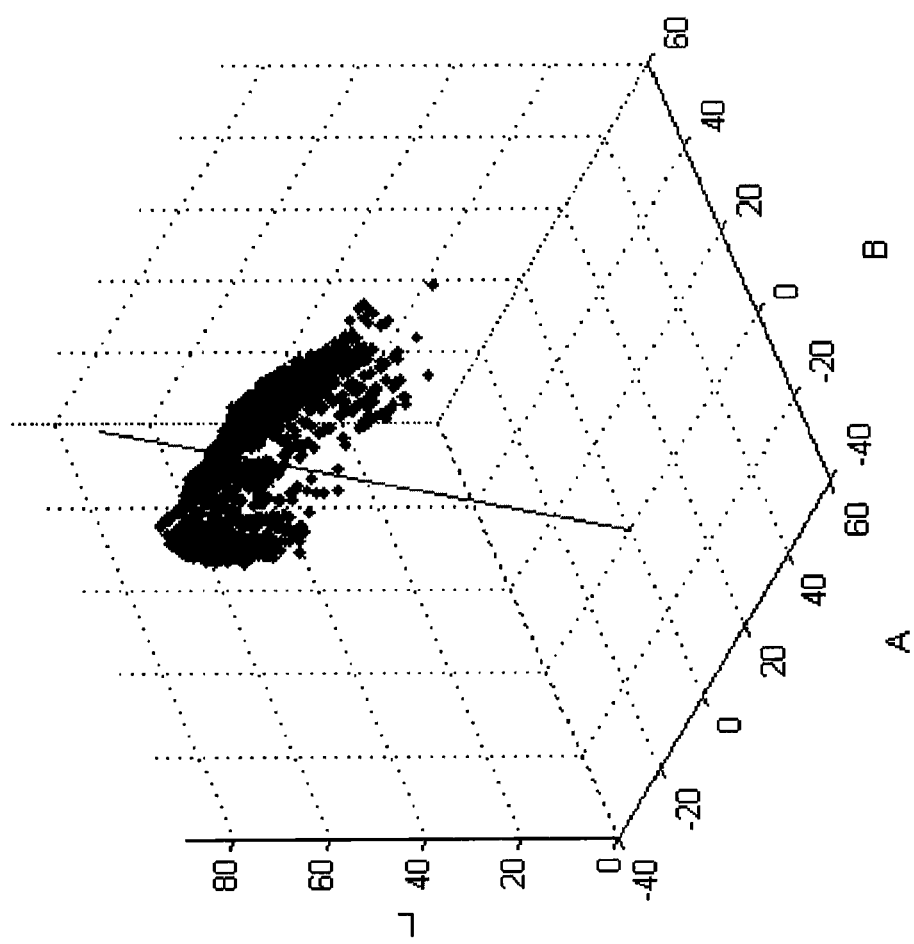
FIG. 5 is a schematic view of a color space after image color analysis of the photographic image in FIG. 4.
Figure 6:
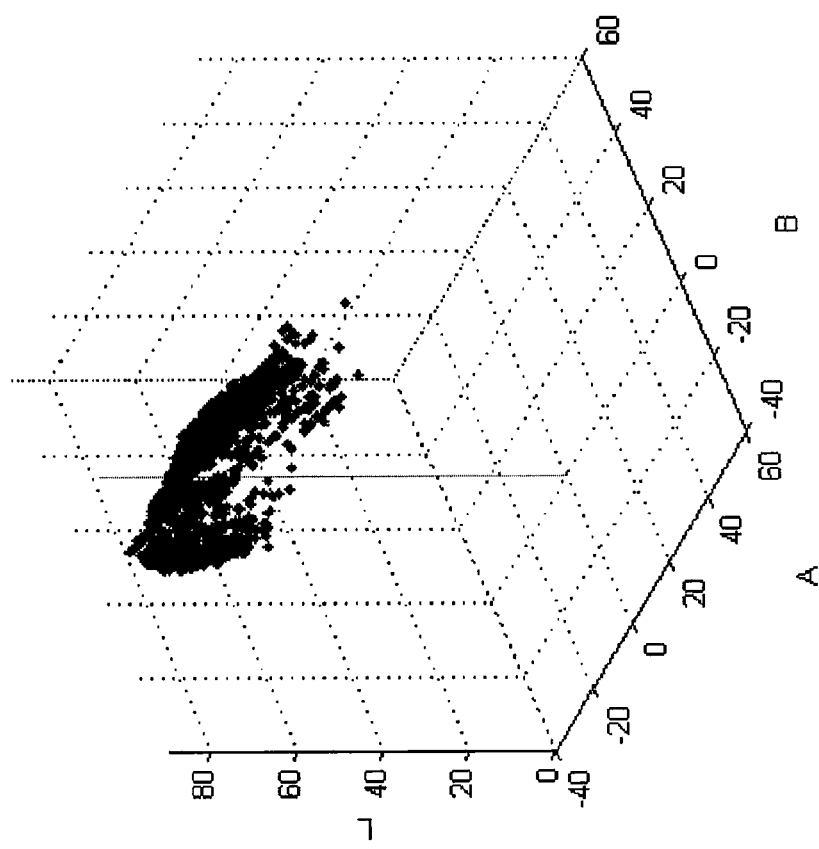
FIG. 6 is a schematic view of a principal axis of the color space in FIG. 5.

FIG. 4 is a schematic view of a photographic image on which image color analysis is to be performed in another embodiment. FIG. 5 is a schematic view of a color space after image color analysis of the photographic image in FIG. 4. FIG. 6 is a schematic view of a principal axis of the color space in FIG. 5.

FIG. 4 can correspond to Steps S211 and S221 in FIG. 2 for obtaining a camera image of a camera. FIG. 5 is a schematic view of a color space after image color analysis of the photographic image in FIG. 4, and can correspond to Steps S212 and S222 in FIG. 2 for converting the camera image from a first color space to a second color space. FIG. 6 is a schematic view of a principal axis of the color space in FIG. 5, and can correspond to Steps S213 and S223 in FIG. 2 for analyzing a color principal axis of the camera image in the second color space.

In view of the above, the present invention is mainly applied in the field of video monitoring. Due to viewing angles, it is usually necessary to utilize multiple cameras to monitor one scenic spot or street. At this time, a color shift exists between the cameras. For example, in a case that policemen want to know that a same red vehicle may pass through which crossings or which the crossings that red vehicles may pass through, if the color shift problem is not solved, lots of misjudgments are caused. The same problem may also occur in pedestrian tracking. Hence, the problem of the color difference between different cameras is solved by the color correction technology in the present invention solves.

Although the present invention has been disclosed through the foregoing embodiments, they are not intended to limit the present invention. Equivalent replacements of variations and modifications made by persons skilled in the art without departing from the spirit and the scope of the present invention still fall within the protection scope of the present invention.

What is claimed is:

1. A method for object color correction, comprising:
    obtaining a first image of a first image capturing device and a second image of a second image capturing device;
    constructing an image conversion model and an image color distribution space model according to an image conversion algorithm;
    introducing the first image and the second image into the image conversion model, and calculating a target image color coefficient and a target image luminance coefficient for converting the first image and the second image from an original color space to a target color space by using the image conversion algorithm;
    converting the first image and the second image from the original color space to the target color space according to the target image color coefficient and the target image luminance coefficient;
    respectively introducing the first image and the second image in the target color space into the image color distribution space model, so as to obtain a first image color distribution space principal axis and a second image color distribution space principal axis respectively;
    comparing the first image color distribution space principal axis and the second image color distribution space principal axis, and correcting them by a processing unit so that the first image color distribution space principal axis and the second image color distribution space principal axis are parallel to each other, so as to adjust a color difference between the first image and the second image;
    reintroducing the first image and the second image in the target color space into the image conversion model, so as to convert the first image and the second image from the target color space to the original color space; and
    obtaining the corrected first image and the corrected second image.

2. The method for object color correction according to claim 1, wherein the first image and the second image have a same subject matter.

3. The method for object color correction according to claim 1, wherein the first image capturing device and the second image capturing device are one of a camera and a video camera.

4. The method for object color correction according to claim 1, wherein the image color distribution space model uses different coefficients of an image color as axes.

5. The method for object color correction according to claim 1, wherein the original color space is an RGB color space.

6. The method for object color correction according to claim 1, wherein the target color space is one of an LAB color space, an HSV color space, and a YUV color space.

7. The method for object color correction according to claim 1, wherein after the step of obtaining the corrected first image and the corrected second image, an image at a preset time point is obtained by comparison using a dynamic time algorithm.

8. A computer program product in a non-transitory computer readable storage medium for object color correction, the product comprising a program code for performing the steps of:
- obtaining a first image of a first image capturing device and a second image of a second image capturing device;
- constructing an image conversion model and an image color distribution space model according to an image conversion algorithm;
- introducing the first image and the second image into the image conversion model, and calculating a target image color coefficient and a target image luminance coefficient for converting the first image and the second image from an original color space to a target color space by using the image conversion algorithm;
- converting the first image and the second image from the original color space to the target color space according to the target image color coefficient and the target image luminance coefficient;
- respectively introducing the first image and the second image in the target color space into the image color distribution space model, so as to obtain a first image color distribution space principal axis and a second image color distribution space principal axis respectively;
- comparing the first image color distribution space principal axis and the second image color distribution space principal axis, and correcting them by a processing unit so that the first image color distribution space principal axis and the second image color distribution space principal axis are parallel to each other, so as to adjust a color difference between the first image and the second image;
- reintroducing the first image and the second image in the target color space into the image conversion model, so as to convert the first image and the second image from the target color space to the original color space; and
- obtaining the corrected first image and the corrected second image.

* * * * *